May 13, 1930.  R. GOLDSCHMIDT  1,758,439
SHAFT COUPLING WITH POWER STORAGE
Filed Feb. 14, 1924  2 Sheets-Sheet 1
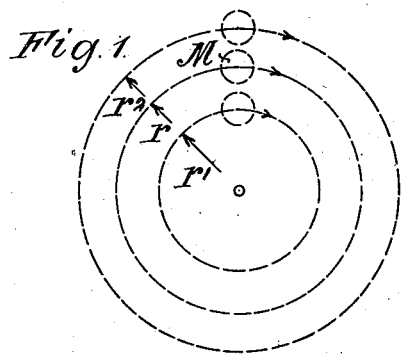
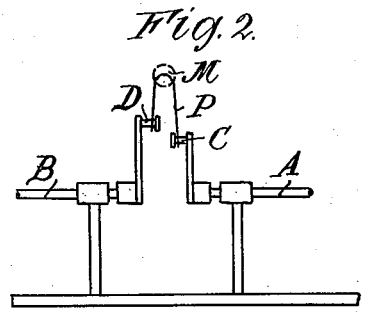
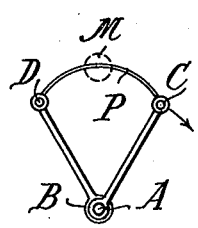
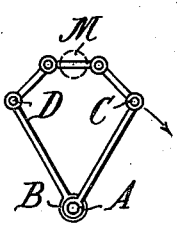
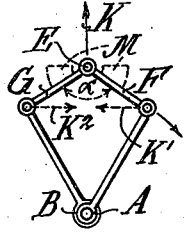
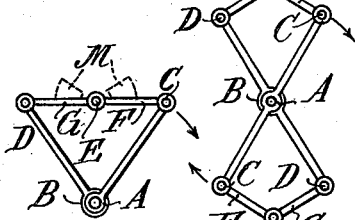
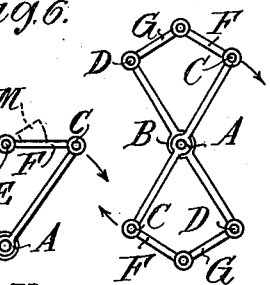
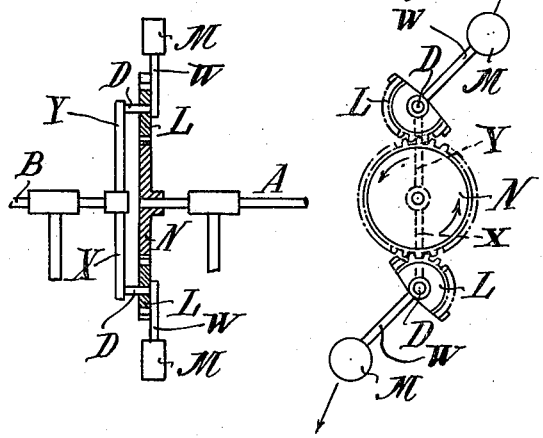
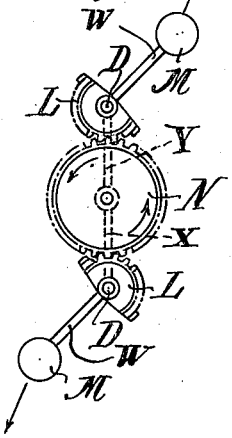
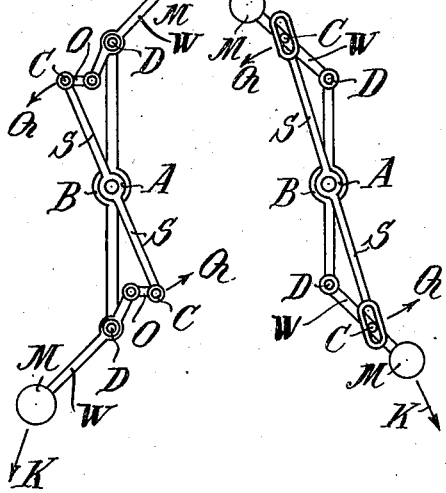
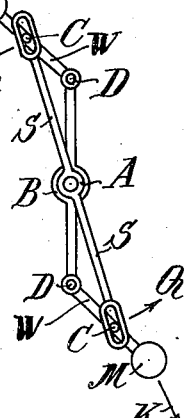
Witnesses:
Inventor:
Rudolf Goldschmidt
by Watson, Coit, Morse & Grindle
Attorney.

May 13, 1930.  R. GOLDSCHMIDT  1,758,439
SHAFT COUPLING WITH POWER STORAGE
Filed Feb. 14, 1924   2 Sheets-Sheet 2
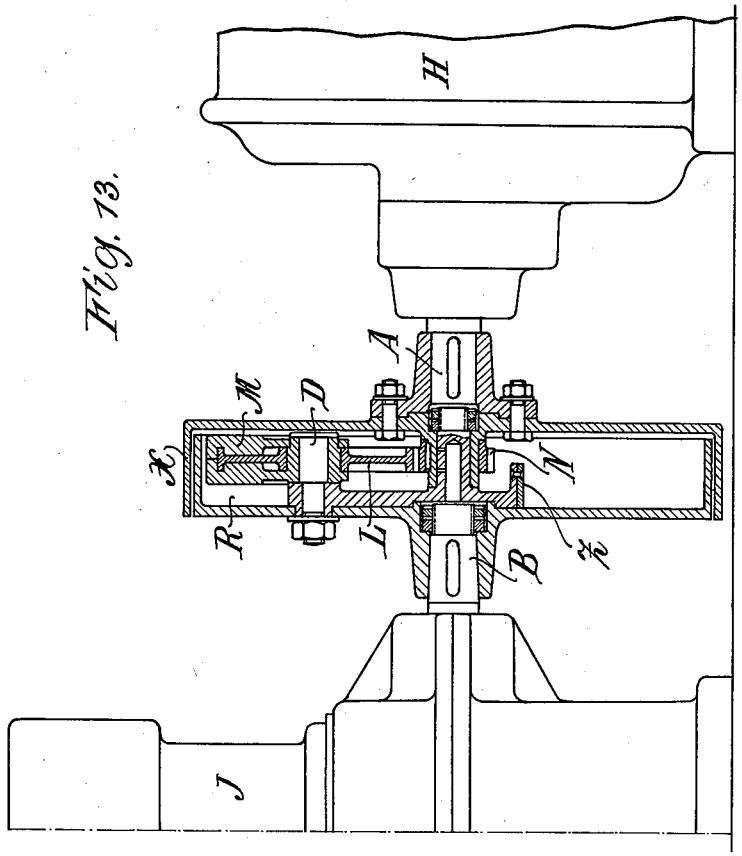
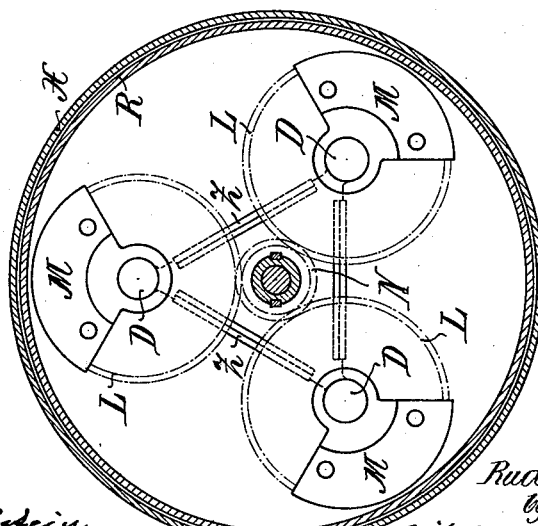
Witnesses:
Inventor.
Rudolf Goldschmidt
by Watson,
Coit, Morse & Grindle
Attorney.

Patented May 13, 1930

1,758,439

UNITED STATES PATENT OFFICE

RUDOLF GOLDSCHMIDT, OF BERLIN, GERMANY

SHAFT COUPLING WITH POWER STORAGE

Application filed February 14, 1924, Serial No. 692,873, and in Germany February 17, 1923.

If two shafts are to be connected by means of a flexible coupling two cases must be distinguished. In the one case a relatively small amount of vibration is taken up by the coupling, the coupling serving in the manner of a vibration insulator or absorber between the two shafts. An ordinary coupling with slight flexibility utilizing springs, leather or resilient material would serve quite well for such insulating purpose. However the case is quite different if the coupling has the function of a regular accumulator of power, to an amount which forms a high percentage of the energy transmitted from one shaft to the other. Then the coupling becomes a storage apparatus often of the same importance as the motor and the driven machine themselves. The use of very strong springs has the disadvantage that the material, after a certain time, deteriorates and that the springs take up a relatively large space and offer unusual constructional difficulties.

This invention relates to a mechanism or mechanisms which avoid the use of springs and allows storage of power with comparatively very small weights which occupy very little space and which can be so arranged with respect to a system of shafts as to have as much or greater elastic properties as springs might possess. The centrifugal force of a fly-weight is utilized. This fly-weight is pivoted to a lever, a flange or an arm fixed to one of the shafts and rotating with it, the radius of rotation of this fly-weight being altered corresponding to the power transmitted by means of connecting rods or gearing or other elements for obtaining the same effect, the said means connecting the fly-weight to a flange or arm fixed to the second shaft.

In order that the invention may be more clearly understood reference is hereinafter made to the accompanying drawings, wherein:—

Fig. 1 is an elemental diagram showing a fly-weight, rotating in different concentric circles.

Figs. 2 and 3 are views of two shafts coupled together and illustrating the general principle of the invention.

Figs. 4, 5, 6, 7, 8 and 9 are side views of couplings, embodying the principle of my invention.

Figs. 10 and 11 show a construction wherein gearing is used to alter the radius of rotation of the fly-weight.

Figs. 12 and 13 are the same construction but somewhat more in detail.

Referring to Fig. 1 the physical principle used in this invention is that a weight M rotating at a certain angular velocity in a circle with the radius $r$, alters the energy stored in its mass, or withdrawn from it, if the radius is reduced to $r'$ or increased to $r^2$, the reduction and increase of the radius of rotation being effected by the pulsation of angular velocity of the two shafts relative to one another.

Figs. 2 and 3 show elemental applications of the invention wherein A is the driving shaft, B the driven shaft. Two pivots C and D are attached to the shafts, eccentric to their centre of rotation. The pivots C and D are connected for instance by a flexible cable P. The cable P may carry a weight M.

Similar in its action but more mechanical in its form is the construction shown in Fig. 4, where instead of the flexible cable a chain of three links is used, while Figs. 5 and 6 have only a chain of two links (F and G). With reference to Fig. 6 the two levers F and G form an angle of 180 degrees, when the shafts have a very low speed. As soon as the speed increases the centrifugal force K (Fig. 5) comes into action and by means of the two levers F and G two forces K' and K² are transmitted to the eccentric pivots C and D. The angle $\alpha$ between the levers F and G alters automatically according to the power transmitted and with it the radius of the fly-weight M. At no-load the angle $\alpha$ between F and G is practically zero and the weight M has the greatest radius possible. If the shafts run at a high angular speed the weights M do not become effective, the natural constructional weight of the levers F and G being ample for producing sufficient centrifugal force.

Fig. 7 is an arrangement where the system of Fig. 5 is duplicated in order to utilize the space as much as possible and to avoid the bearings having to carry the extra load arising from the centrifugal force.

Fig. 8 illustrates a side view of an arrangement where the fly-weights M are attached to the pivots D in connection with one of the shafts B, and where the radius of the fly-weights is altered by means of levers S in connection with the other shaft A and connecting links O.

Fig. 9 is a slight modification of Fig. 8 where the connecting links O are eliminated and replaced by a slit in the levers S, in which the pivot C of the arms of the weights M can slide. These levers constructions form examples only. The choice of the arrangement depends on the practical conditions, especially on the amount of regulation and power required.

The construction of Figs. 10 and 11 is similar to Figs. 8 and 9 in which the fly-weights M with their arms W are attached to the pivots D, which are connected through the arms X and Y to the shaft B. Fixed to the arms W of M are the gear wheels L, working together with a central gear wheel N, the latter being fixed to the other shaft A. This arrangement permits a choice of the degree of elasticity, of the coupling in very wide ranges, by simply altering the gear ratio. If for instance the central gear wheel N is small and the other gear wheels L are large, then the regulation is a very fine one. The two shafts A and B may complete a whole revolution and more, relative to one another, without the fly-weights M being deflected from their central position more than ± 90 degrees, which is their regulation within the range of stability.

Figs. 12 and 13 give more details of the gear wheel's construction in practical machines. J and H are the driving and driven machines respectively with the shafts B and A. Attached to these shafts are the flanges R and X, which have been so constructed that they form a casing for the coupling. The pivots D are screwed into the flange R and carry three fly-weights M with their gear wheels L. The centre gear wheel N is fixed to the flange X. In order to limit the range of regulation as long as the speed is not high enough to produce sufficient centrifugal force in M, abutments Z are provided, to limit the movement of the fly-weights M. They may be fitted with buffers of leather, springs or of any other kind.

While I have described preferred embodiments of my invention, I desire that it be understood that equivalents may be employed and that no limitations upon the invention are intended other than are imposed by the scope of the following claims.

I claim:

1. Mechanism for coupling together two rotating shafts with a connection resilient by virtue of centrifugal forces comprising two aligned shafts, arms respectively secured to one of said shafts and mechanically connected to each other, fly-weights carried by at least one of said arms, means connected to the other of said aligned shafts and resiliently interconnected with said arms, and means to apply the centrifugal forces due to said fly-weights to restrain the angular displacements of one of said shafts relative to the other.

2. Mechanism for coupling two shafts with a connection resilient by virtue of centrifugal forces comprising two shafts operating at the same speed, a member attached to one of said shafts, a fly-weight pivoted to said member, a gear wheel attached to said fly-weight, and a second gear wheel fixed to the second shaft, said gear wheels each being revolvable with respect to each other, whereby said fly-weight may freely change its position under the action of centrifugal force except as restrained by the turning moment communicated from one shaft to the other through said gear wheels.

3. Mechanism for coupling together two rotating shafts with a connection resilient by virtue of centrifugal forces comprising an arm carried by one of said shafts, fly-weights pivoted thereto, a member carried by the other of said shafts, and a lost motion connection between said arms and said member whereby said fly-weights are free to change their radius of rotation under the influence of centrifugal forces except as restrained by the turning moment communicated from one shaft to the other through said lost motion connection.

4. The combination of a power shaft and a driven shaft, a casing carried by one of said shafts, a mechanism within said casing for resiliently coupling said shafts comprising fly-weights pivoted eccentrically on said casing and means for opposing only the forces due to the turning moment between said shafts against the centrifugal forces of said fly-weights to secure resilient coupling between said shafts.

In testimony whereof I have signed my name to this specification.

RUDOLF GOLDSCHMIDT.